United States Patent
Madson

(10) Patent No.: US 12,258,148 B2
(45) Date of Patent: Mar. 25, 2025

(54) SYSTEM AND METHOD FOR TESTING A NO-BACK SYSTEM

(71) Applicant: Eaton Intelligent Power Limited, Dublin (IE)

(72) Inventor: Ryan Madson, Bloomington, MN (US)

(73) Assignee: Eaton Intelligent Power Limited, Dublin (IE)

( * ) Notice: Subject to any disclaimer, the term of this patent is extended or adjusted under 35 U.S.C. 154(b) by 233 days.

(21) Appl. No.: 17/721,942

(22) Filed: Apr. 15, 2022

(65) Prior Publication Data

US 2022/0332436 A1  Oct. 20, 2022

Related U.S. Application Data

(60) Provisional application No. 63/175,365, filed on Apr. 15, 2021.

(51) Int. Cl.
| | |
|---|---|
| *G01M 13/00* | (2019.01) |
| *B64C 13/50* | (2006.01) |
| *B64F 5/60* | (2017.01) |
| *B64D 45/00* | (2006.01) |
| *G01M 99/00* | (2011.01) |

(52) U.S. Cl.
CPC ............... *B64F 5/60* (2017.01); *B64C 13/50* (2013.01); *B64D 2045/0085* (2013.01); *G01M 99/008* (2013.01)

(58) Field of Classification Search
None
See application file for complete search history.

(56) References Cited

U.S. PATENT DOCUMENTS

| | | | |
|---|---|---|---|
| 6,109,415 A | 8/2000 | Morgan et al. | |
| 7,556,224 B2 * | 7/2009 | Johnson | B64C 13/50 |
| | | | 244/175 |
| 8,918,291 B2 * | 12/2014 | Tallot | B64C 5/10 |
| | | | 702/34 |
| 2015/0081102 A1 * | 3/2015 | Kopp | F16H 61/2807 |
| | | | 700/275 |
| 2019/0145149 A1 * | 5/2019 | Yanagita | B60J 1/17 |
| | | | 318/696 |
| 2020/0056688 A1 * | 2/2020 | Barger | F16D 63/008 |
| 2022/0228654 A1 | 7/2022 | Curtis et al. | |
| 2022/0380022 A1 | 12/2022 | Roberts et al. | |

FOREIGN PATENT DOCUMENTS

| | | |
|---|---|---|
| EP | 3 613 667 A2 | 2/2020 |
| WO | 2016/205092 A1 | 12/2016 |

OTHER PUBLICATIONS

French Preliminary Search Report for Application No. 2203513 mailed Sep. 25, 2023.

* cited by examiner

*Primary Examiner* — Jill E Culler
*Assistant Examiner* — Ruben C Parco, Jr.
(74) *Attorney, Agent, or Firm* — Merchant & Gould P.C.

(57) ABSTRACT

A system and method for testing no-back systems. In one embodiment, the system and method includes multiple actuators that are driven in an asynchronous manner as to impart internal forces that mimic external loads on the system. The actuators can be monitored to determine whether the no-back systems are performing as expected when loads are applied to the actuators.

20 Claims, 5 Drawing Sheets

SYSTEM AND METHOD FOR TESTING A NO-BACK SYSTEM

CROSS-REFERENCE TO RELATED APPLICATION

This application claims the benefit of U.S. Provisional Application Ser. No. 63/175,365, filed Apr. 15, 2021, the disclosure of which is hereby incorporated by reference in its entirety.

BACKGROUND

Actuators are commonly used to control and drive motion. Two common types of actuators are a hydraulic actuator and an electromechanical actuator. Typically, hydraulic actuators are preferred over electromechanical actuators in applications that involve driving heavy loads at a relatively high rate of speed. However, in certain applications, it can be desirable to drive heavy loads at high rates of speed with electromechanical actuation. In such applications, an electromechanical ball screw type actuator may be used. The pitch of a ball screw actuator can be adjusted to drive loads at faster rates of speed, however back driving forces can then become a challenge. In some applications, it is very important that large back driving forces are resisted. Various no-backing systems have been developed to resist back driving forces. An example of a ball screw system with a no-back device is disclosed in U.S. Pat. No. 6,109,415 to Morgan et al. filed on May 29, 1998.

It is desirable to test the no-back assemblies in a controlled situation to determine if the systems are operational prior to the systems being relied on in the field. However, it can be challenging to test such systems as they function when large external loads are applied to the system. Applying large external loads to the actuators can be cumbersome, time consuming, and otherwise challenging. Improved systems and methods of testing no-back systems are desired.

SUMMARY

The present disclosure provides a system and method for testing no-back systems. In one embodiment, the system and method include multiple actuators that are driven in an asynchronous manner as to impart internal forces that mimic external loads on the system. The actuators can be monitored to determine whether the no-back systems are performing as expected when loads are applied to the actuators.

In one embodiment of the present disclosure, a pair of actuators are connected to a common structural member such as a wing flap. One actuator is extended more than another which skews the wing flap and generates bending forces in the wing flap. Some of those forces are transferred back to the actuators and are used to mimic various external load forces such as air pressure on the wing flap during flight. In the depicted embodiment, the actuators can be driven in the axial direction of the forces acting on the actuator and data can be collected such as the electrical current through the actuator motors and/or the rotations of the motor. The sense data can be analyzed to determine whether the no-back system is operational. The no-back system is operational when it sufficiently resists the forces imparted on the actuators.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

The actuator system of the depicted embodiment can be used in a wide range of applications. One example application for the actuator system of the present disclosure is to extend and retract flaps on a wing of an airplane. The actuator system in this example context must be able to drive large forces at a relatively high rate of speed. The back driving forces from the airflow across the wings can be substantial. It should be appreciated that many other applications and configurations are possible.

Figure 1:
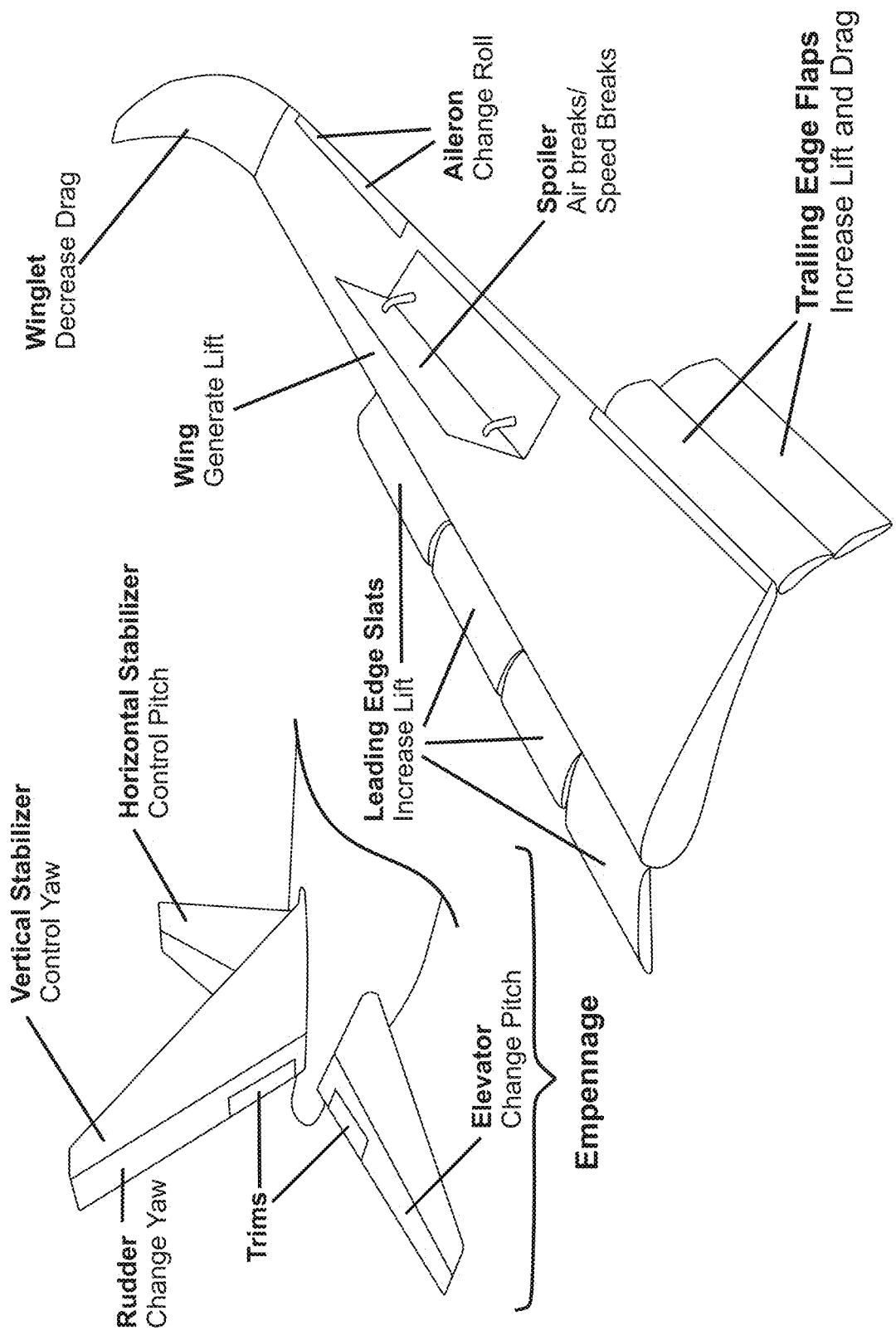
FIG. 1 is an actuator system of the present disclosure in an example aerospace application.

Referring to FIG. 1, portions of an aircraft are shown. In the depicted embodiment, a number of movable structural components (e.g., flap) are mounted to the aircraft and actuated by two or more actuators that extend and retract synchronously. The movable structural components are used to control the aircraft (e.g., provide lift, slow the plane down, improve flight efficiency, provide directional control, etc.).

In the depicted embodiment, synchronous extension of a pair of actuators may extend flaps on the aircraft and synchronous retraction of the pair of actuators may retract flaps on the aircraft. Depending on the orientation of the flaps, the force of gravity may be acting to either extend or retract the flap. In addition, depending on other external forces such as the force of the air moving along the aircraft (air pressure), the external forces may be acting to extend or retract the flap.

It is desirable that these external forces are resisted so that the flaps maintain their position even if there is a failure in the system (e.g., a failure of the electrical motor). In the context of an actuator that controls the position of flaps on an aircraft, it is better that the flaps fail to move as directed but hold their position rather than fail to move as directed and also fail to hold their position. It is generally desirable that external forces not be allowed to back drive the actuators. No-back assemblies are commonly incorporated into the actuators to resist the back driving forces. It should be appreciated that many other applications are possible.

Figure 2:
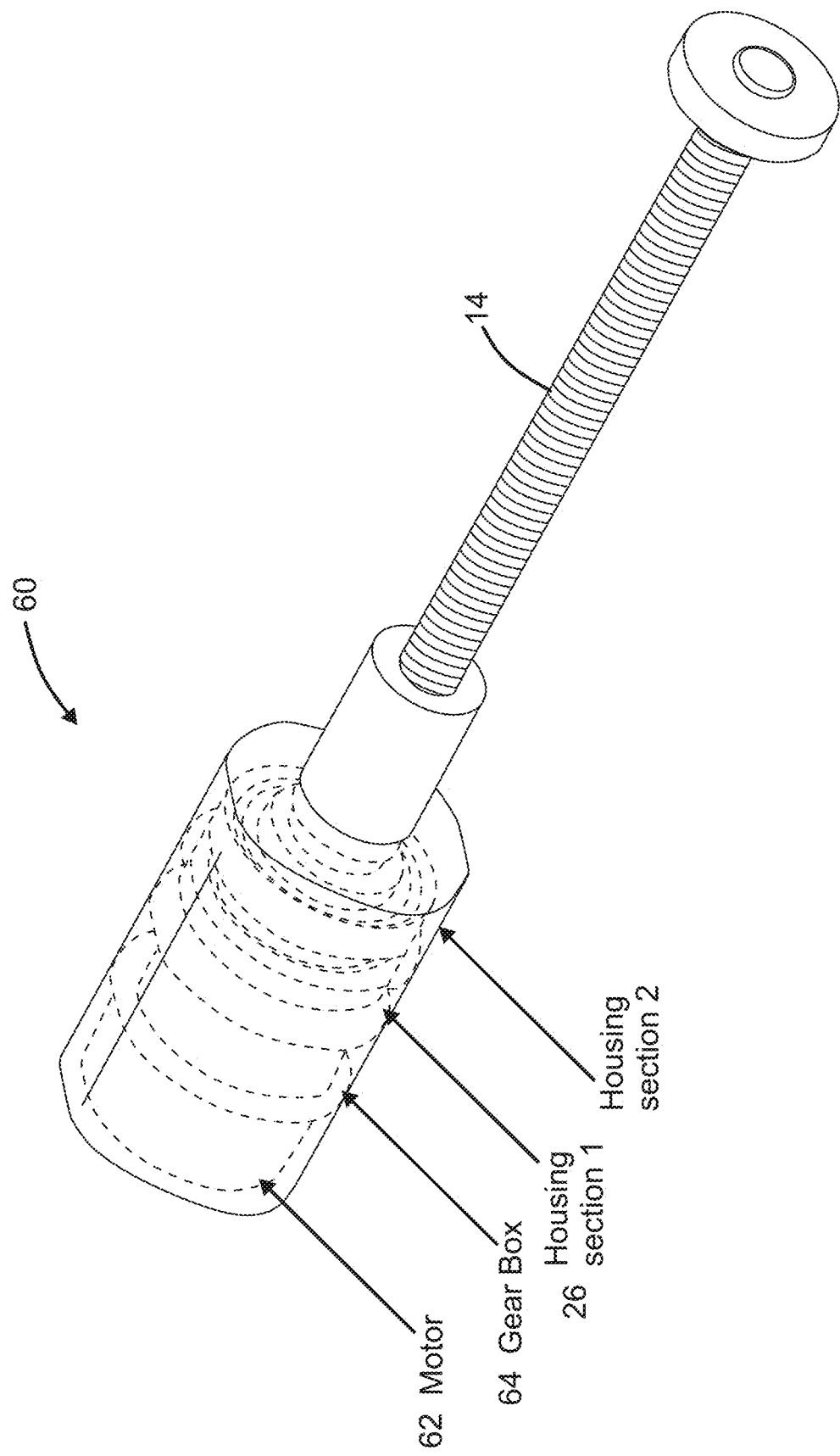
FIG. 2 is an isometric view of an example actuator according to the principles of the present disclosure.

Referring to FIG. 2, in the depicted embodiment, the principles of the present disclosure are incorporated into a ball screw type electromechanical actuator 60. In the depicted embodiment, the actuator 60 includes a motor 62 that drives a gear box 64 within a housing 26. A ball screw drive shaft 14 extends into the housing 26 and is driven to rotate about its longitudinal axis by the gear box 64. Rotation of the ball screw drive shaft 14 about its longitudinal axis linearly drives the nut 66 along the ball screw drive shaft 14. The object being actuated (e.g., flaps of an aircraft wing) is connected to the nut 66. It should be appreciated that certain aspects of the present disclosure are applicable to actuators that are not considered to be a ball screw type actuator.

In the depicted embodiment, when the ball screw drive shaft 14 is rotated in a first direction, the nut 66 is driven extending away from the housing 26. When the ball screw drive shaft 14 is rotated in a second direction, the nut 66 is retracted.

It should be appreciated that the back driving force (e.g., air pressure on the flaps, gravity, etc.) can apply either a tension force on the ball screw drive shaft 14 (force acting in the direction to extend the actuator) or a compression force on the ball screw drive shaft 14 (force acting in the direction to retract the actuator). Regardless of the direction, the system of the present disclosure is configured to resist the back driving force. The system is configured to include no-back assemblies that resist the back driving forces without electrical power. In the event the electronics fail, the ball screw drive shaft 14 holds its position despite external forces acting on the ball screw drive shaft 14.

Many different types of no-back configurations are possible. For additional information about no-back devices see "SCREW DRIVE WITH SELF-LOCKING MECHANISM," U.S. Patent App. Ser. No. 63/139,574 filed on Jan. 20, 2021, which is incorporated by reference herein in its entirety. It should be appreciated that many other alternative configurations are also possible.

Figure 3:
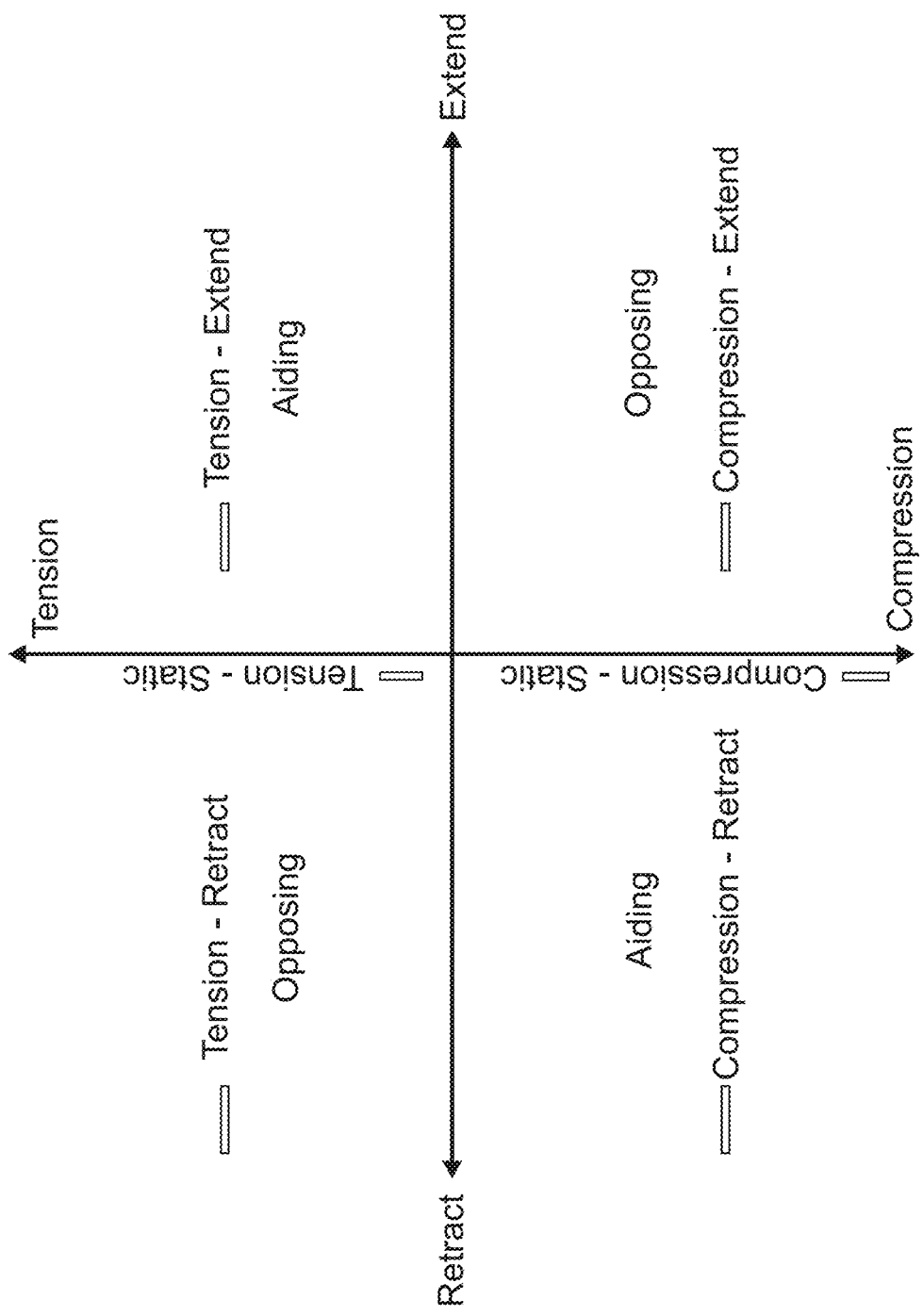
FIG. 3 identifies a number of possible operating scenarios of the actuator according to the principles of the present disclosure.
Figure 4:
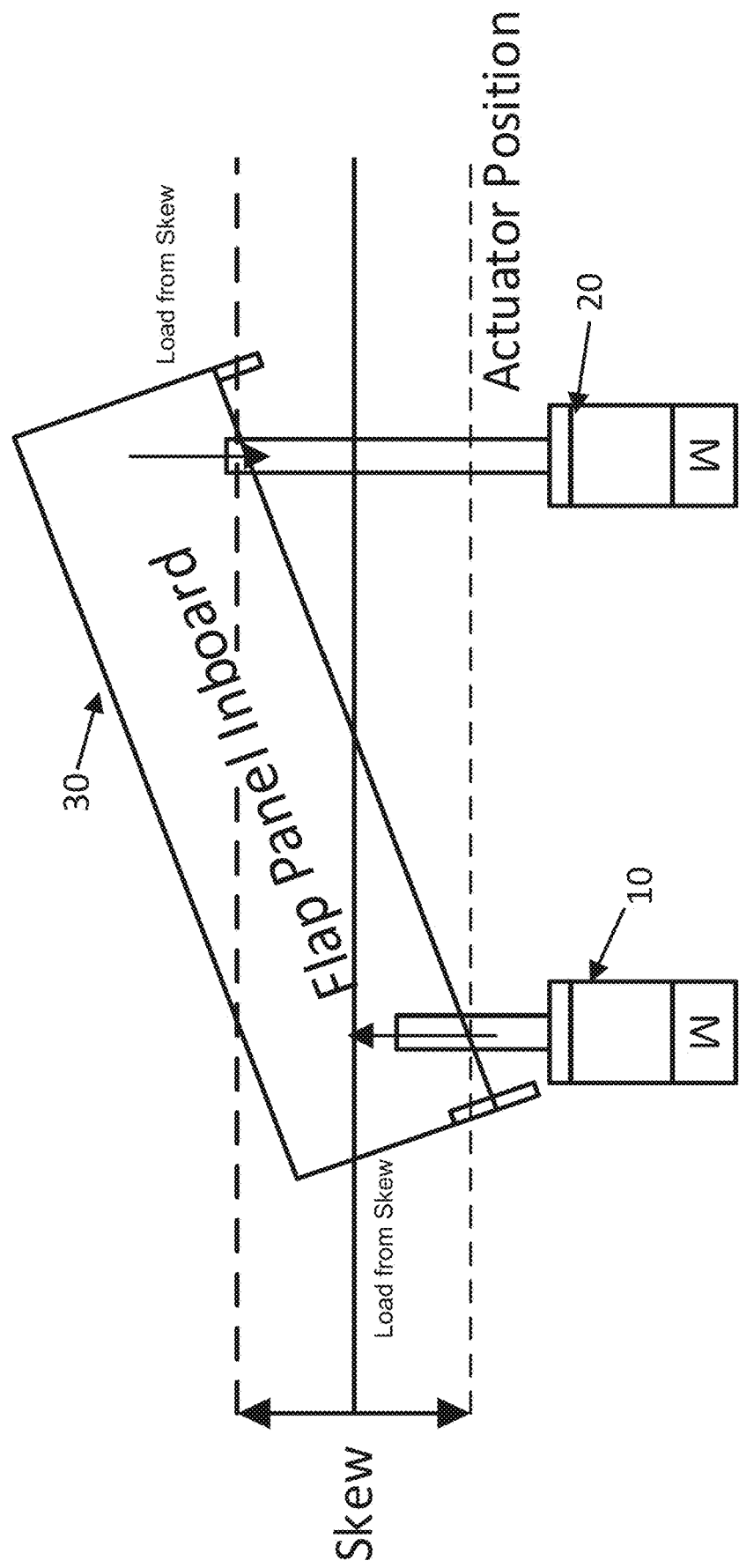
FIG. 4 is a top view of an actuator system in a no-back testing mode.

Referring to FIG. 3 and Table 1, six of the operational scenarios are described.

TABLE 1

| State | Back Driving Forces | Motor | Operation |
|---|---|---|---|
| Condition 1 - See FIG. 3 (down the Y-axis) | Compressive | Static | The compression no-back system is engaged and holds position |
| Condition 2 - See FIG. 3 (up the Y-axis) | Tension | Static | The tension no-back system is engaged and holds position |
| Condition 3 - See FIG. 3 (lower left quadrant) | Compressive (Aid loading-the external force is in the direction to retract the actuator) | Retract | The compression no-back system is engaged; Motor overcomes the friction on the left side of the no-back system and the actuator retracts |
| Condition 4 - See FIG. 3 (lower right quadrant) | Compressive (opposing the force of the motor) | Extend | Motor overcomes the compressive back driving force |
| Condition 5 - See FIG. 3 (upper left quadrant) | Tension (opposing the force of the motor) | Retract | Motor overcomes the tension back driving force |
| Condition 6 - See FIG. 3 | Tension (Aid loading-the | Extend | The tension no-back system is engaged; |

TABLE 1-continued

| State | Back Driving Forces | Motor | Operation |
|---|---|---|---|
| (upper right quadrant) | external force is in the direction to extend the actuator) | | Motor overcomes the friction on the right side of the no-back system |

In order to test the no-back functionality in the depicted embodiment, it is desirable to simulate various conditions. For example, it may be desirable to simulate condition 3 and condition 6, which are aid loading conditions to test the respective no-back assemblies configured to resist that type of external loading.

The present disclosure provides a system and method for simulating aid loading to test the no-back assemblies. In the present disclosure, the actuators are driven asynchronously to create an intentional skew in the flap. The skew generates a bending force in the flap that imparts forces to the actuators that are connected thereto.

In the depicted embodiment, the actuator 10 is extended to, for example thirty five percent, of its full extension and the actuator 20 is extended to, for example forty percent, of its full extension. This unequal amount of extension skews the flap 30 and creates a bending force in the flap 30 that acts to pull the actuator 10 in an extension direction and to push the actuator 20 in a compression direction.

In the depicted embodiment, if the actuator 10 extends as a result of the pulling forces imparted to it by the flap 30, the no-back assembly that is configured to resist that back driving force is not operating as designed. A sensor such as a Hall-effect sensor could be used to detect this motion. If the actuator 10 is driven to extend and less force is required than expected to drive the movement, the no-back assembly configured to resist the back driving force is likely not functioning properly. The amount of effort required to drive the motor can be monitored by monitoring the current. For example, if the motor generates current, the no-back assembly is not functioning properly as the aiding force is being felt by the actuator 10.

In the depicted embodiment, in the skewed no-back testing configuration described above, various no-back assemblies in the actuator 20 can be tested. As described above, the flap 30 applies a compressive force on the actuator 20. If the actuator 20 spontaneously retracts as a result of this force, the no-back assembly designed to resist the back driving forces is not functioning properly. If the actuator 20 is driven to retract and the motor generates electricity, the no-back assembly is likely not functioning properly. If the no-back assembly is functioning properly, the actuator 20 will not feel the external compressive force that is applied to it by the skewed flap 30. It will retract when driven to retract and an expected amount of electrical current will be required to drive that action (e.g., a few amps).

In the depicted embodiment, each actuator 10, 20 may include two no-back assemblies. Each of the no-back assemblies may be configured to isolate the actuator 10, 20 from external forces acting in a different direction. In the depicted embodiment, the system can be driven such that the actuator 10 is extended to, for example forty percent, and the actuator 20 could be extended to, for example thirty five percent. In this configuration, the flap 30 would be bent and impart a compression force on the actuator 10 and a tension force on the actuator 20. If the actuator 10 spontaneously extends or if the actuator 20 spontaneously retracts, the no-back assemblies therein intended to resist that force are not functioning. If the actuator 10 is driven to extend and the motor therein generates current, then the no-back assemblies are likely not functioning properly. If the actuator 20 is driven to retract and the motor therein generates current, then the no-back assemblies are likely not functioning properly.

Figure 5:
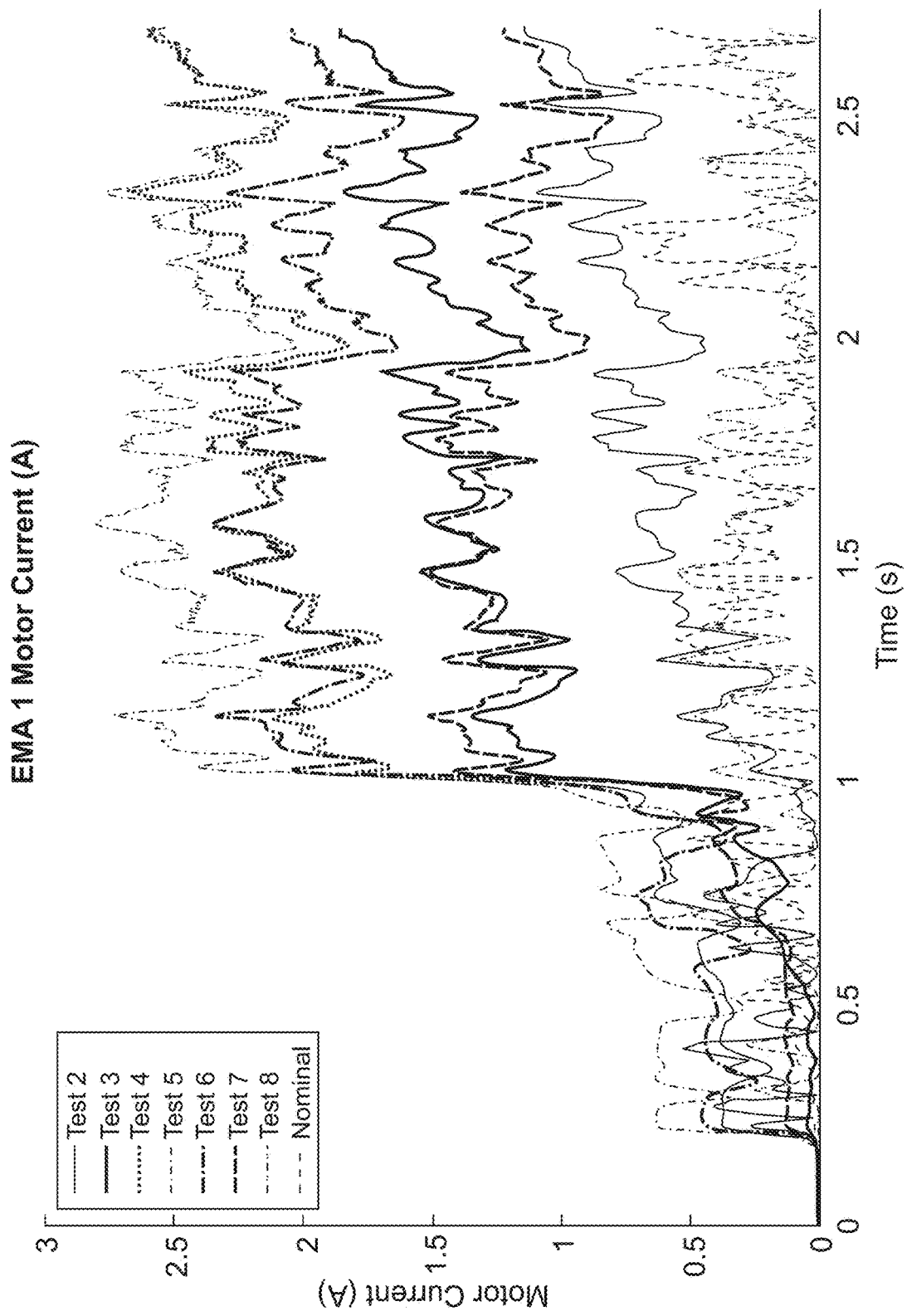
FIG. 5 is a graph depicting no-back test data.

Referring to FIG. 5, a graph depicting the current response in the motor of an actuator with a failed no-back assembly is compared to an actuator with an operational no-back assembly. The graph depicts that when the aiding forces acting on the actuator are greater in magnitude, the discrepancy in the current response in the failed no-back assembly as compared to the operational no-back assembly is larger and therefore easier to detect. The method of using the actuator to induce a skew in the flap thereby generating external forces on the actuator provides a way to generate large enough aiding forces (e.g., 300+ lbs., 400-600 lbs., etc.) to detect failures in the no-back systems.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A method of testing a no-back assembly of an actuator, the method comprising:
providing a first actuator connected to a structural member;
providing a second actuator connected to the structural member;
extending the first actuator to a different extent than the second actuator generating stresses in the structural member that impart forces on the first and second actuators;
driving the first actuator while monitoring a drive component of a drive system of the first actuator to determine whether a no-back assembly of the first actuator has isolated the drive system of the first actuator from the forces imparted on the first actuator by the structural member; and
based on monitoring the drive component, determining whether the no-back assembly has failed.

2. The method of claim 1, wherein the step of monitoring the drive component of the drive system of the first actuator includes employing a motor position sensor.

3. The method of claim 1, wherein the step of monitoring the drive component of the drive system of the first actuator includes monitoring electrical current through a motor of the first actuator.

4. The method of claim 1, wherein the step of extending the first actuator to a different extent than the second actuator results in deformation of the structural member.

5. The method of claim 1, wherein the step of driving the first actuator while monitoring the drive component of the drive system of the first actuator includes driving the first actuator in the direction of the forces acting on the first actuator from the structural member.

6. The method of claim 1, wherein the structural member is a flap of an aircraft.

7. The method of claim 1, wherein the no-back assemblies are integrated with the first and second actuators on an aircraft and the method of testing of the no-back assemblies is accomplished without applying external loads to the aircraft.

8. The method of claim 1, wherein asynchronous control of the first and second actuators generates over 400 pounds of axial loading on the first and second actuators.

9. A method of testing a no-back assembly of an actuator system, the actuator system including a first actuator and a second actuator connected to a structural member, the method comprising:
extending the first actuator to a first extent;
extending the second actuator to a second extent, the second actuator generating stresses in the structural member that impart forces on the first and second actuators;
driving the first actuator while monitoring a drive component of a drive system of the first actuator to determine whether a no-back assembly of the first actuator has isolated the drive system of the first actuator from the forces imparted on the first actuator by the structural member; and
based on monitoring the drive component, determining whether the no-back assembly has failed.

10. The method of claim 9, wherein the first extent is different from the second extent.

11. The method of claim 9, wherein the step of monitoring the drive component of the drive system of the first actuator includes employing a motor position sensor.

12. The method of claim 9, wherein the step of monitoring the drive component of the drive system of the first actuator includes monitoring electrical current through a motor of the first actuator.

13. The method of claim 10, wherein the step of extending the first actuator to a different extent than the second actuator results in deformation of the structural member.

14. The method of claim 9, wherein the step of driving the first actuator while monitoring the drive component of the drive system of the first actuator includes driving the first actuator in the direction of the forces acting on the first actuator from the structural member.

15. The method of claim 9, wherein the structural member is a flap of an aircraft.

16. The method of claim 9, wherein the no-back assemblies are integrated with the first and second actuators on an aircraft and the method of testing of the no-back assemblies is accomplished without applying external loads to the aircraft, and wherein asynchronous control of the first and second actuators generates over 400 pounds of axial loading on the first and second actuators.

17. The method of claim 1, wherein a farther extension of one of the first or second actuator creates an unequal skew in the structural member and creates a bending force in the structural member that acts to pull the extended one of the first or second actuator in an extension direction and to push the other of the first or second actuator in a compression direction.

18. The method of claim 9, wherein a farther extension of one of the first or second actuator creates an unequal skew in the structural member and creates a bending force in the structural member that acts to pull the extended one of the first or second actuator in an extension direction and to push the other of the first or second actuator in a compression direction.

19. The method of claim 17, wherein when the lesser extended one of the first or second actuator is driven to retract and a motor generates electricity, the no-back assembly is determined not be functioning properly.

20. The method of claim 18, wherein when the lesser extended one of the first or second actuator is driven to retract and a motor generates electricity, the no-back assembly is determined not be functioning properly.

* * * * *